Patented June 25, 1935

2,006,043

UNITED STATES PATENT OFFICE 2,006,043

SYNTHETIC RESIN

Harry B. Dykstra, Wilmington, Del., assignor to E. I. du Pont de Nemours & Company, Wilmington, Del., a corporation of Delaware No Drawing. Application January 19, 1933,
Serial No. 652,573

20 Claims. (Cl. 260—4)

This invention relates to new synthetic resins, more particularly to a type of synthetic resin with desirable properties, obtainable from aldehydes and unsaturated phenols.

This invention then has as a general object the preparation of new phenolic resins. A particular object of this invention is the production of new synthetic resins of value in molding and coating compositions. A further particular object of this invention is the production of new resins which can be blended to advantage with drying oils. Other objects will appear hereinafter.

The aforementioned and other objects have been accomplished by condensing phenols containing an unsaturated open chain hydrocarbon substituent and having at least two of the readily reactive positions unsubstituted, (the para and two ortho positions being referred to whenever the term "readily reactive positions" occurs in this specification and the accompanying claims). As condensing agent an aldehyde, preferably formaldehyde, is used and the reaction may be conducted in the presence or absence of catalysts, solvents or other auxiliary agents such as wetting agents, anti-oxidants, etc., which are often helpful in the preparation of the resin.

The procedures for the preparation of phenol-aldehyde resins are, in general, applicable to the preparation of unsaturated phenol-aldehyde resins. In some cases, however, special precautions are necessary because of the tendency of the unsaturated phenol to polymerize (gel).

The designation "unsaturated phenols" as used herein includes phenols having unsaturated substituents as, for example, alkenyl, alkinyl, and alkadienyl groups.

The following examples of the preparation of resins from unsaturated phenols are given for purposes of illustration and are not to be construed as setting limitations on the scope of the invention.

Example I

A mixture of 20 parts by weight of ortho crotyl phenol, prepared according to the method described in Ber. 59, 2350, (1926), 20 parts by weight of 37% aqueous formaldehyde, and 0.4 parts by weight of hexamethylenetetramine was heated under reflux on a steam bath for about sixteen hours. The water and unreacted formaldehyde were then removed by distillation, leaving a residue of soft, reddish-brown resin. This material was soluble in ethyl alcohol, acetone, ethyl acetate, benzene and Hi-flash naphtha, but was insoluble in aliphatic hydrocarbons.

Example II

A mixture containing 25 parts by weight of ortho allyl phenol, 38 parts by weight of 37% aqueous formaldehyde, and 93 parts by weight of 2 N. sodium hydroxide solution was allowed to stand at room temperature for several days. The mixture was then acidified with 6 N. hydrochloric acid, which caused a reddish-colored oil to separate. This oil was readily soluble in ethyl acetate. It was converted into a resinous material by heating at 125° C. to 130° C. for several hours.

Example III

Ten parts by weight of ortho alpha methyl allyl phenol, prepared as described in Ber. 59, 2349 (1926), 10 parts by weight of 37% aqueous formaldehyde, and 0.2 parts by weight of hexamethylenetetramine were heated for twenty hours under reflux. The aqueous layer was poured off and the residue, which consisted of 8 parts by weight, was heated further to remove unreacted constituents. The reddish-brown resin obtained in this manner was soluble in ethyl alcohol, butyl alcohol, acetone, ethyl acetate, butyl acetate, benzene, and toluene, but was insoluble in aliphatic hydrocarbons.

As shown in the examples, resins of the alkenyl phenol-formaldehyde type are initially soluble in a variety of lacquer and varnish solvents. In this form, the products can be advantageously used as ingredients in coating compositions. For the most part, the alkenyl phenol-formaldehyde resins give slow drying films. Several hours heating at 125° C to 150° C. are usually required to secure hard films. When this stage is reached, the films are substantially insoluble in organic solvents. While this change to the insoluble form is probably analogous, in part, to the change to the insoluble form which takes place in the case of the simple phenol-formaldehyde resins, it is thought that polymerization of the oil or vinyl type involving the alkenyl groups is partly responsible for the change to the insoluble state. Oxidation also appears to play a part in this transformation. This tendency of condensation products of aldehydes and unsaturated phenols to undergo polymerization of the oil or vinyl type is a desirable property, since it imparts to the products the properties of both the bakelite and oil-type resins.

Although the alkenyl phenol-formaldehyde resins may be used alone, they form particularly useful products when mixed with other materials. Their solubility and compatibility characteristics make it possible to blend them with natural resins, synthetic resins, e. g., polyhydric alcohol-polybasic acid resins and vinyl resins, drying oils, softeners, pigments, driers, varnishes, etc., and to a limited extent with cellulose derivatives. The addition of the alkenyl phenol-formaldehyde resin generally improves the durability of the coating composition. Take, for example, the following formula for a lacquer:

|   | Parts |
|---|---|
| Meta styrene | 75 |
| Crotyl phenol-formaldehyde resin (product of Example I) | 25 |
| Toluene | 200 |
| Xylene | 100 |

Films of this composition over plain steel showed no failure when exposed out-of-doors for five months, while films of meta styrene alone checked badly within a few days.

As previously noted, the invention is not limited to the unsaturated phenols mentioned in the examples. Many other mono- and poly-unsaturated phenols may be used. As examples may be mentioned o-vinyl phenol, m-vinyl phenol, o-propenyl phenol, p-propenyl phenol, o-isopropenyl phenol, p-allyl phenol, 5-methyl-2-isopropenyl phenol, 3-methyl-2-allyl phenol, hesperitol (2-methoxy-5-vinyl phenol), and butadienyl phenol. Unsaturated phenols of the polyhydric class as, for example, vinyl pyrocatechol (3, 4-dihydroxy-1-vinyl benzene) allyl pyrocatechol (3, 4-dihydroxy-1-allyl benzene), and isopropenyl resorcinol (2, 4-dihydroxy-1-isopropenyl benzene), also come within the scope of the present invention.

Polynuclear phenols containing an unsaturated substituent or substituents may be used in this resin synthesis. For example, valuable resins may be obtained by reacting unsaturated derivatives (e. g., crotyl derivatives) of diphenylol propane (di(4 - hydroxyphenyl)dimethylmethane) with formaldehyde. Resins obtained in this manner, owing possibly to the higher melting point of the phenol, are harder than those prepared from the mono-nuclear phenols, and are of special value in coating compositions. Useful resins are also produced from unsaturated derivatives of diphenylol sulfone (di(4-hydroxyphenyl) sulfone). The presence of sulfur in these resins appears to impart improved resistance to fire and certain corrosive agents.

It is also within the scope of this invention to use mixtures of phenols and/or aldehydes in the preparation of the resins. In place of the monomeric aldehydes, polymers such as paraformaldehyde may be employed.

The condensation need not necessarily be carried out in the presence of alkaline catalysts, as used in the examples; acid catalysts, as for example acetic acid, oxalic acid, boric acid, and hydrochloric acid, may also be used, or the catalyst may be omitted. The use of solvents is also permissible.

In addition to being useful as ingredients in plastic and coating compositions, my new products are also valuable in the manufacture of adhesives, impregnating compositions, etc. The wide solubility range of these materials is a marked advantage over the limited solubility of the simple phenol-formaldehyde resins (bakelite) since the latter, even in the initial fusible state, have poor solubility in lacquer and varnish solvents. The relatively good compatibility of the unsaturated phenol-formaldehyde resins with most film-forming materials makes it possible to incorporate these resins in a wide variety of coating compositions.

As many apparently widely different embodiments of this invention may be made without departing from the spirit and scope thereof, it is to be understood that I do not limit myself to the specific embodiments thereof except as defined in the appended claims, and the limitations which I have set on the unsaturated phenols to be used for this purpose.

I claim:

1. The process of producing phenol-aldehyde resins which comprises condensing with an aldehyde a phenol containing an unsaturated open chain hydrocarbon substituent and having at least two of the readily reactive positions unsubstituted.

2. The process of producing phenol-aldehyde resins which comprises condensing with an aldehyde in the presence of a catalyst a phenol containing an unsaturated open chain hydrocarbon substituent and having at least two of the readily reactive positions unsubstituted.

3. The process of producing phenol-aldehyde resins which comprises condensing with an aldehyde in the presence of hexamethylenetetramine a phenol containing an unsaturated open chain hydrocarbon substituent and having at least two of the readily reactive positions unsubstituted.

4. The process of producing phenol-aldehyde resins which comprises condensing with formaldehyde a phenol containing an unsaturated open chain hydrocarbon substituent and having at least two of the readily reactive positions unsubstituted, in the presence of a catalyst.

5. The process of producing phenol-aldehyde resins which comprises condensing crotyl phenol with formaldehyde in the presence of a catalyst.

6. The process of producing phenol-aldehyde resins which comprises condensing allyl phenol with formaldehyde in the presence of a catalyst.

7. The process of producing phenol-aldehyde resins which comprises condensing with at least one aldehyde a mixture of phenols containing in each case unsaturated open chain hydrocarbon substituents and having in each case at least two of the readily reactive positions unsubstituted.

8. The process of producing phenol-aldehyde resins which comprises condensing with at least one aldehyde a mixture of phenols of which at least one contains an unsaturated open chain hydrocarbon substituent and has at least two of the readily reactive positions unsubstituted.

9. A phenol-aldehyde resin comprising a condensation product of an aldehyde and a phenol containing an unsaturated open chain hydrocarbon substituent and having at least two of the readily reactive positions unsubstituted.

10. A phenol-aldehyde resin comprising the condensation product of formaldehyde and a phenol containing an unsaturated open chain hydrocarbon substituent and having at least two of the readily reactive positions unsubstituted.

11. A phenol-aldehyde resin comprising the product of the condensation, in the presence of a catalyst, of formaldehyde and a phenol containing an unsaturated open chain hydrocarbon substituent and having at least two of the readily reactive positions unsubstituted.

12. A phenol-aldehyde resin comprising the condensation product of at least one aldehyde and a mixture of phenols containing in each case an unsaturated open chain hydrocarbon substituent and having in each case at least two of the readily reactive positions unsubstituted.

13. A phenol-aldehyde resin comprising the condensation product of at least one aldehyde and a mixture of phenols of which at least one contains an unsaturated open chain hydrocarbon substituent and has at least two of the readily reactive positions unsubstituted.

14. A phenol aldehyde resin comprising the condensation product of an aldehyde and a substituted diphenylolpropane having at least two unsubstituted readily reactive positions and having at least one of the nuclear hydrogen atoms replaced by an unsaturated open chain hydrocarbon radical.

15. A process for producing resins which comprises reacting together an aldehyde and a substituted diphenylolpropane having at least two unsubstituted readily reactive positions and having at least one of the nuclear hydrogen atoms replaced by an unsaturated open chain hydrocarbon radical.

16. A phenol aldehyde resin comprising the product of the condensation of crotyl phenol with formaldehyde in the presence of a catalyst.

17. A phenol aldehyde resin comprising the product of the condensation of allyl phenol with formaldehyde in the presence of a catalyst.

18. A phenol aldehyde resin comprising the product of the condensation of an aldehyde and a phenol containing an unsaturated open chain hydrocarbon substituent and having at least two of the readily reactive positions unsubstituted, in the presence of a catalyst.

19. The process of producing phenol-aldehyde resin which comprises condensing with an aldehyde a polynuclear phenol having non-condensed nuclei, said phenol also having at least two unsubstituted readily reactive positions and at least one nuclear hydrogen atom replaced by an unsaturated open chain hydrocarbon radical.

20. A phenol-aldehyde resin comprising the condensation product of an aldehyde and a polynuclear phenol having non-condensed nuclei, said phenol also having at least two unsubstituted readily reactive positions and at least one nuclear hydrogen atom replaced by an unsaturated open chain hydrocarbon radical.

HARRY B. DYKSTRA.